(12) United States Patent
Parthasarathy et al.

(10) Patent No.: US 11,799,714 B2
(45) Date of Patent: Oct. 24, 2023

(54) DEVICE MANAGEMENT USING BASEBOARD MANAGEMENT CONTROLLERS AND MANAGEMENT PROCESSORS

(71) Applicant: HEWLETT PACKARD ENTERPRISE DEVELOPMENT LP, Houston, TX (US)

(72) Inventors: Mohan Parthasarathy, Karnataka (IN); Matthew James Muggeridge, Clear Island Waters (AU); Vinay Venugopal, Karnataka (IN); Srinivasan Varadarajan Sahasranamam, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/652,335

(22) Filed: Feb. 24, 2022

(65) Prior Publication Data

US 2023/0269126 A1    Aug. 24, 2023

(51) Int. Cl.
*H04L 41/04* (2022.01)
*G06F 9/48* (2006.01)

(52) U.S. Cl.
CPC ............. *H04L 41/04* (2013.01); *G06F 9/48* (2013.01)

(58) Field of Classification Search
CPC ................... H04L 41/04; G06F 9/48
See application file for complete search history.

(56) References Cited

U.S. PATENT DOCUMENTS

| | | | |
|---|---|---|---|
| 7,234,073 B1 * | 6/2007 | Roytman | G06F 11/2025 714/E11.073 |
| 9,853,938 B2 | 12/2017 | Shih | |
| 9,866,548 B2 | 1/2018 | Shih | |
| 10,015,023 B2 | 7/2018 | Shih | |
| 10,223,229 B2 | 3/2019 | Wang | |
| 10,298,479 B2 | 5/2019 | Wang | |
| 10,509,456 B2 | 12/2019 | Lin | |
| 10,754,722 B1 | 8/2020 | Lin | |
| 10,842,041 B2 | 11/2020 | Lin | |
| 11,194,680 B2 * | 12/2021 | Konka | H04L 43/20 |

(Continued)

OTHER PUBLICATIONS

Brey et al., "Blade Centrer Chassis Management", IBM Journal of Research and Development (vol. 49, Issue:6), Nov. 2005, IBM Publisher, pp. 941-961.*

(Continued)

*Primary Examiner* — Todd L Barker
(74) *Attorney, Agent, or Firm* — Trop, Pruner & Hu, P.C.

(57) ABSTRACT

In some examples, a system includes a plurality of electronic devices each comprising a respective management processor and a baseboard management controller (BMC). A management processor of a cluster of management processors is a primary management processor to act as a management controller for the plurality of electronic devices. The management controller interacts with the BMC in a respective electronic device to perform management of the respective electronic device. The cluster of management processors performs failover responsive to a fault of the primary management processor to select another management processor of the cluster of the management processors as the management controller.

17 Claims, 4 Drawing Sheets

(56) References Cited

U.S. PATENT DOCUMENTS

| | | | | |
|---|---|---|---|---|
| 11,243,589 | B1* | 2/2022 | Bowen | G06F 8/65 |
| 2015/0373115 | A1* | 12/2015 | Breakstone | G06F 11/2069 |
| | | | | 709/217 |
| 2016/0239370 | A1 | 8/2016 | Chen | |
| 2017/0262011 | A1* | 9/2017 | Kwon | G06F 11/1608 |
| 2020/0050523 | A1* | 2/2020 | Pawlowski | G06F 13/28 |
| 2020/0136943 | A1* | 4/2020 | Ban | H04L 43/20 |
| 2020/0305300 | A1 | 9/2020 | Lin | |
| 2021/0342213 | A1* | 11/2021 | Kotary | G06F 11/0724 |
| 2021/0344497 | A1* | 11/2021 | Wright | H04L 9/0643 |
| 2021/0374084 | A1* | 12/2021 | Liang | G06F 13/4022 |
| 2021/0405097 | A1* | 12/2021 | Campbell | G01R 21/006 |
| 2022/0308860 | A1* | 9/2022 | Morecroft | G06F 8/61 |

OTHER PUBLICATIONS

Bajic et al., "Implementation of High Availability Server Cluster by Using Fencing Concept", 18th International Symposium INFOTECH, Mar. 20, 2019.*

Meier et al., "IEEE 1588 applied in the enviroment of high availability LANs", IEEE Symposium on Precision Clock Synchronization for Measurement, Contorl and Communication, Oct. 2007.*

Naik, "Docket Container-Based Big Data Processing System in Multiple Clouds for Everyone", IEEE International Systems Engineering Symposium, Oct. 11, 2017, IEEE Publishing.*

Vayghan et al., "Microservices Based Architectures: Toward High-Availability for Stateful Applications with Kubernetes", IEEE 19th International Conference on Software Quallity, Reliability and Security, Jul. 22, 2019, IEEE Publishing.*

Telco 5G, Platform9, How to Create Multi-Master Kubernetes Clusters downloaded Jan. 17, 2022 (12 pages).

Pratheek Prabhakaran, How to set up a Pacemaker cluster for high availability Linux, May 28, 2021 (8 pages).

HP Enterprise, Technical White Paper, HPE Superdome Flex Server Architecture and RAS, May 2021 (22 pages).

HP Enterprise, QuickSpecs, HPE Superdome Flex, Dec. 6, 2021 (37 pages).

Andy Jeffries, CIVO.com, What's the difference between k3s vs k8s, Sep. 24, 2019 (5 pages).

Rania Mohamed, www.suse.com, Kubemetes Cluster vs Master Node, Apr. 16, 2019 (6 pages).

Wikipedia, Red Hat cluster suite last edited Mar. 15, 2020 (3 pages).

Wikipedia, Kubernetes last edited Jan. 16, 2022 (14 pages).

Wikipedia, Pacemaker (Software) last edited Oct. 14, 2021 (2 pages).

Wikipedia, Redfish (specification) last edited Dec. 9, 2021 (4 pages).

* cited by examiner

DEVICE MANAGEMENT USING BASEBOARD MANAGEMENT CONTROLLERS AND MANAGEMENT PROCESSORS

BACKGROUND

A computing environment can include a relatively large number (hundreds, thousands, etc.) of electronic devices, such as server computers, storage systems, communication nodes, Internet-of-things (IoT) devices, and so forth. In some examples, the computing environment is a data center associated with an enterprise, such as a business concern, a government agency, an education organization, an individual, and so forth. In further examples, the computing environment can include a cloud, a web-based computing environment, and so forth.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

An electronic device in a computing environment can be managed from a remote location using a management component in the electronic device. For example, a systems administrator at a remote computer (or other remote entity) can access the management component in the electronic device over a network, which in some cases can be a management network that is separate from a data network used for data communications of the electronic device.

In some examples, the management component in the electronic device includes a baseboard management controller (BMC).

A "BMC" can refer to a specialized service controller that monitors the physical state of an electronic device using sensors and communicates with a remote management system (that is remote from the electronic device) through an independent "out-of-band" connection. The BMC can perform management tasks to manage components of the electronic device. Examples of management tasks that can be performed by the BMC can include any or some combination of the following: power control to perform power management of the electronic device (such as to transition the electronic device between different power consumption states in response to detected events), thermal monitoring and control of the electronic device (such as to monitor temperatures of the electronic device and to control thermal management states of the electronic device), fan control of fans in the electronic device, system health monitoring based on monitoring measurement data from various sensors of the electronic device, remote access of the electronic device (to access the electronic device over a network, for example), remote reboot of the electronic device (to trigger the electronic device to reboot using a remote command), system setup and deployment of the electronic device, system security to implement security procedures in the electronic device, and so forth.

In some examples, the BMC can provide so-called "lights-out" functionality for an electronic device. The lights out functionality may allow a user, such as a systems administrator, to perform management operations on the electronic device even if an operating system (OS) is not installed or not functional on the electronic device.

Moreover, in some examples, the BMC can run on auxiliary power provided by an auxiliary power supply (e.g., a battery); as a result, the electronic device does not have to be powered on to allow the BMC to perform the BMC's operations. The auxiliary power supply is separate from a main power supply that supplies powers to other components (e.g., a main processor, a memory, an input/output (I/O) device, etc.) of the electronic device.

In some examples, in addition to the BMC in each electronic device, an additional management controller (separate from the BMCs) can be used to interact with the BMCs to perform management of the electronic devices. In examples where the electronic devices are server computers (or other types of electronic devices) mounted in a rack, the additional management controller can be referred to as a rack management controller (RMC). A "rack" refers to a mounting structure that has supports for multiple electronic devices.

More generally, the additional management controller can be referred to as a "system management controller" to manage a collection of electronic devices that each further includes a BMC.

The system management controller can perform any or some combination of the following tasks. For example, the system management controller can provide a command interface to allow a remote management device, such as one associated with a systems administrator, to submit commands to the system management controller to perform electronic device management operations. The interface can include a command-line interface in which commands are submitted to the system management controller as lines of text. In other examples, the interface can include a graphical user interface (GUI).

Alternatively or additionally, the system management controller can provide a RESTful API (API is an abbreviation for "application programming interface" and REST is an abbreviation for "REpresentational State Transfer") that is an interface for management of information technology (IT) components such as servers, storage, etc. An example of the RESTful API is provided by a REDFISH interface, which is a standardized interface (defined by a suite of specifications) for management of electronic devices using various management tools, scripts, and so forth.

An interface provided by the system management controller can also be used by a remote entity to access information collected by the system management controller and/or the BMCs, such as analysis logs, reports, and so forth.

The system management controller can perform analysis of components (e.g., hardware, programs, etc.) of the electronic devices for faults. A "fault" can refer to any anomaly in a component (hardware or machine-readable instructions or data) of an electronic device that prevents an expected operation of the electronic device. For example, the fault can include a hardware failure, machine-readable instructions crashing or producing an error, an error in data, and so forth.

The system management controller can predict a fault in the electronic devices. For example, the system management controller can monitor health data (e.g., measurement data from various sensors in the electronic devices) to predict when a fault is expected to occur.

The system management controller can initiate recovery actions in response to detected or predicted faults. The recovery actions can include sending an alert to a target recipient (e.g., a systems administrator or another entity), powering off an electronic device, rebooting an electronic device, isolating a component in an electronic device, and so forth.

The system management controller can perform firmware management to manage versions of firmware loaded in the electronic devices. For example, firmware can include machine-readable instructions such as Basic Input/Output System (BIOS) code, firmware of hardware I/O devices, and so forth.

The system management controller can partition the electronic devices into multiple partitions (where each partition can include a collection of electronic devices, where a "collection of electronic devices" can refer to a single electronic device or multiple electronic devices). Each partition of electronic devices can be managed by the system management controller independently of another partition.

The BMC in each electronic device can interface with the system management controller, and can perform management tasks instructed by the system management controller. In some examples, the system management controller is external of the electronic devices, and can be coupled to the BMCs over a network, such as a local area network (LAN) or another type of network.

The use of the system management controller to work with the BMCs of the respective individual electronic devices allows for overall system management that can be accomplished without the system management controller having to drill down into the details associated with each individual electronic device. The BMC of an individual electronic device is aware of the specific configuration of each electronic device that can be leveraged for management of the electronic device using the combination of the system management controller and the BMC of the electronic device.

In a large computing environment with a relatively large number of electronic devices (e.g., hundreds, thousands, hundreds of thousands, millions, etc., of electronic devices), the load on the system management controller can be relatively high, which can adversely affect performance of management operations, since the system management controller may have to perform a relatively large number of management tasks in conjunction with the BMCs.

Also, if the system management controller were to experience a fault (e.g., due to an error of machine-readable instructions in the system management controller, a failure of a hardware component, a failure of a communications link, etc.), then management of the electronic devices using the system management controller may not be possible.

In accordance with some implementations of the present disclosure, a high-availability arrangement is provided to perform management of multiple electronic devices, such as server computers in a rack or another arrangement. The electronic devices include BMCs and respective management processors. The BMCs and management processors are "onboard" management components since they are included within respective electronic devices. This is in contrast with an external system management controller (as discussed above) that is external of the electronic devices.

The onboard management processors make up a cluster of management processors, and one (or more) of the management processors can be elected as a primary management processor to operate as a rack management controller (or more generally, a system management controller). Thus, instead of using a system management controller that is external of electronic devices that are being managed, an onboard management processor can be used to perform the tasks of the system management controller.

A "management processor" refers to a processor that is able to perform management tasks, such as those of the system management controller discussed above. As used here, a "processor" can include a microprocessor, a core of a multi-core microprocessor, a microcontroller, a programmable integrated circuit, a programmable gate array, or another hardware processing circuit.

In accordance with some implementations of the present disclosure, the primary management processor can delegate management tasks to other onboard management processors in the cluster to offload such management tasks. As a result, management tasks can be distributed across multiple management processors for load balancing to reduce the likelihood that any individual management processor is overburdened.

A "cluster of management processors" can refer to any grouping of management processors that are configured to work together to manage operations of electronic devices.

In addition to load balancing, the cluster of management processors can also provide fault tolerance to provide high-availability operation. For example, if the primary management processor were to experience a fault, then failover to another management processor to become the primary management processor can be performed. Additionally, if any given management processor were to experience a fault, the primary management processor can delegate the management tasks of the given management processor to another management processor.

Figure 1:
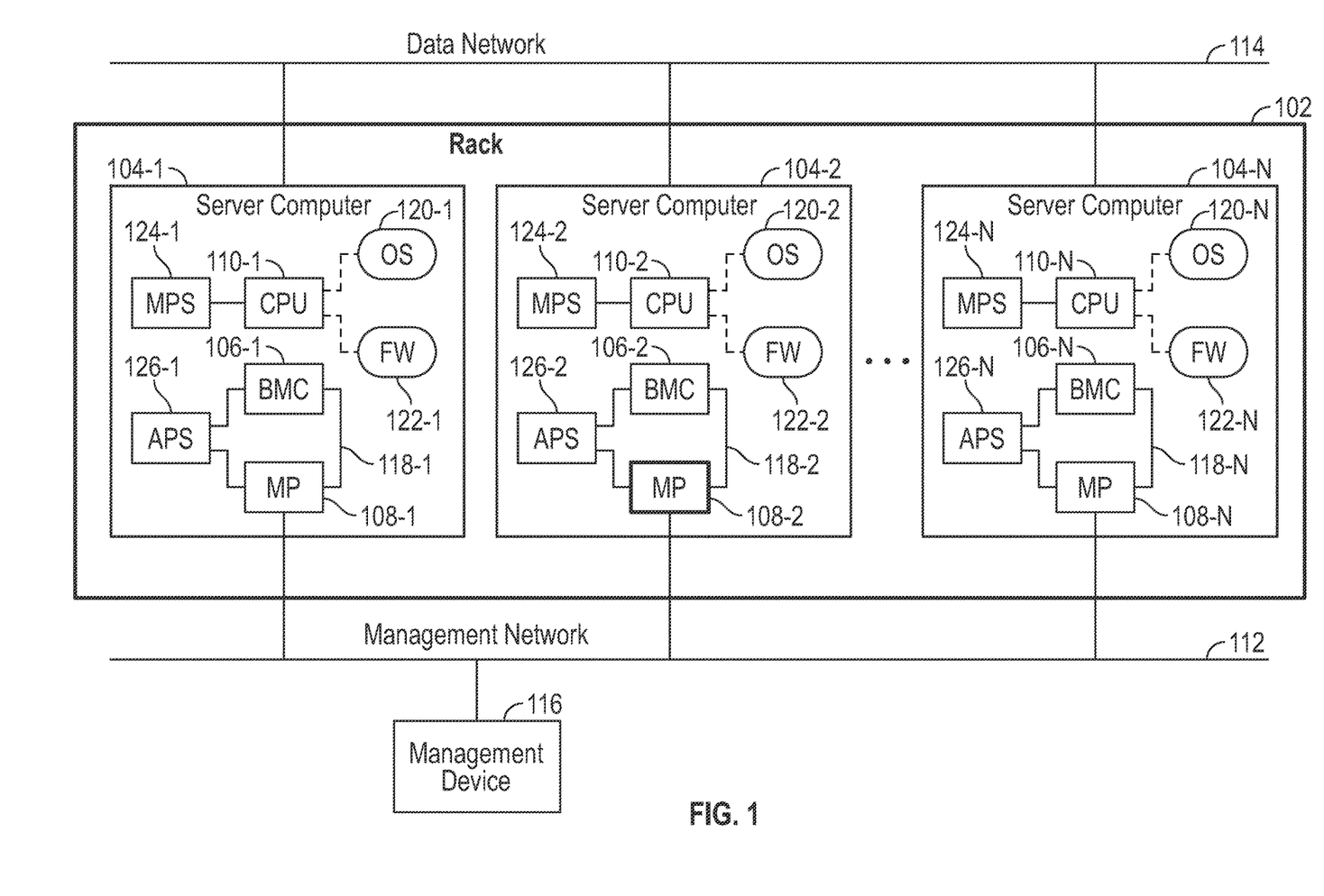
FIG. 1 is a block diagram of an arrangement that includes electronic devices and management components according to some examples.

FIG. 1 is a block diagram of an example arrangement that includes a rack 102 in which are mounted server computers 104-1, 104-2, . . . , 104-N (N≥2).

Although reference is made to the server computers 104-1 to 104-N being mounted in the rack 102 in FIG. 1, in other examples, the server computers 104-1 to 104-N can be in other types of mounting structures, or can be freely standing without being mounted in any type of mounting structure.

Also, although reference is made to server computers in FIG. 1, in other examples, an arrangement can include other types of electronic devices, such as storage systems, communication nodes, IoT devices, and so forth.

In some examples, the server computers 104-1 to 104-N can be scale-up or scale-out server nodes. A "scale-up" system allows for support of additional workload by increasing the processing/storage capacity of each node, which is a server computer in FIG. 1. A "scale-out" system allows for support of additional workload by adding more nodes (e.g., server computers).

Each server computer includes a BMC, a management processor, and a central processing unit (CPU). A CPU refers to the main processor of a server computer. The server computer can include one CPU or multiple CPUs. A CPU can include a microprocessor, a core of a multi-core microprocessor, a microcontroller, a programmable integrated circuit, a programmable gate array, or another hardware processing circuit.

In the arrangement of FIG. 1, instead of using a single system management controller that is external of the server computers 104-1 to 104-N, local (onboard) management processors are included in the respective server computers. Each server computer further includes a BMC. Thus, for example, the server computer 104-1 includes a BMC 106-1, a management processor 108-1, and a CPU 110-1. Similarly, the server computer 104-2 includes a BMC 106-2, a management processor 108-2, and a CPU 110-2, and the server computer 104-N includes a BMC 106-N, a management processor 108-N, and a CPU 110-N.

Each management processor 108-1 to 108-N can perform any or some combination of the tasks that can be performed by the system management controller discussed above.

In other examples, a "management processor" can also refer to a node controller in a server computer or another type of electronic device. For example, a node controller can perform power control and/or capping (capping the amount of power that can be used by a server computer). The node controller can also collect measurement data that is accessible by a remote entity.

In accordance with some examples of the present disclosure, one (or more than one) of the management processors 108-1 to 108-N can be elected as a primary management processor to serve as a management controller (similar to the system management controller discussed further above). However, the management controller implemented with the primary management processor is onboard a server computer and is not external of the server computers 104-1 to 104-N.

In the example of FIG. 1, the management processor 108-2 has been elected as the primary management processor. In further examples, more than one management processor can be elected as a primary management processor, resulting in multiple primary management processors that can provide load balancing and/or redundancy in case of a fault of any of the primary management processors.

Even in examples where just a single primary management processor is elected, high-availability is still provided since another management processor can be elected as the primary management processor in case a current primary management processor experiences a fault.

The management processors 108-1 to 108-N form a cluster of management processors. In further examples, less than all of the management processors 108-1 to 108-N can form a cluster of management processors. For example, the management processors 108-1 and 108-2 can be part of the cluster while the management processor 108-N is not part of the cluster. Omitting a management processor of the server computers 104-1 to 104-N can be performed for any of various reasons (e.g., the omitted management processor is non-functional or is experiencing a fault, the omitted management processor does not have a reliable network connection, the omitted management processor is not executing a correct version of machine-readable instructions, and so forth).

In examples where the management processor 108-2 has been elected as the primary management processor, the remaining management processors (108-1, 108-N) are referred to as "member management processors" to which the primary management processor can assign management tasks.

As further shown in FIG. 1, the management processors 108-1 to 108-N are connected to a management network 112. The management network 112 is distinct and separate from a data network 114 that is used by the server computers 104-1 to 104-N to communicate data with each other as well as to communicate with other devices coupled to the data network 114. Each management processor can include a network interface to connect to the management network 112. Alternatively, each management processor can be coupled through a network interface in the respective server computer to the management network 112.

The management network 112 is an "out-of-band" network since the management network 112 allows management-related information to be communicated with the server computers 104-1 to 104-N over a communication path that is separate from the data network 114.

The management network 112 allows a remote management device 116 (such as a device associated with a systems administrator) or another entity to access the server computers 104-1 to 104-N to perform management operations with respect to the server computers. In some examples, the management device 116 can include a desktop computer, a notebook computer, a tablet computer, a smartphone, or any other type of electronic device.

In addition, each BMC is locally connected to its respective management processor. Thus, the BMC 106-1 is connected over a communication link 118-1 to the management processor 108-1, the BMC 106-2 is connected over a communication link 118-2 to the management processor 108-2, and the BMC 106-N is connected over a communication link 118-N to the management processor 108-N.

Each communication link 118-1, 118-2, or 118-N can be in the form of a local area network (LAN) or another type of communication link, such as a computer bus.

Each management processor 108-1, 108-2, or 108-N can present an interface (or multiple interfaces) that can be accessed by the management device 116. The interface(s) can include a command line interface, a GUI, a REDFISH interface, and so forth. Although reference is made to the REDFISH interface in some examples, it is noted that in other examples, other types of interfaces (whether standardized or proprietary) can be presented by each management processor for the purpose of managing the respective server computer in which the management processor is located.

The management processors 108-1 to 108-N in the cluster can perform a distributed election process by which one (or more than one) management processor is elected as a primary management processor. The distributed election process is performed based on cooperation of multiple management processors in the cluster. The election of the primary management processor can be based on any one or some combination of the following criteria: a current processing load of a management processor (e.g., a given management processor with a lower processing load than other management processors in the cluster may be favored to be elected as the primary management processor); a network status of the management processor (e.g., a communication bandwidth of a management processor, where a given management processor with a higher communication bandwidth than other management processors in the cluster may be favored to be elected as the management primary management processor); a health status of a management processor (e.g., based on faults detected in each management processor, where a given management processor that is healthier (has less faults) than other management processors in the cluster may be favored to be elected as the primary management processor); a random criterion (in which a primary management processor is randomly selected from among the cluster of management processors); and so forth.

Each server computer includes a respective OS, firmware, and other machine-readable instructions. For example, the server computer 104-1 includes an OS 120-1 and a firmware 122-1 (e.g., a BIOS), which are executable on the CPU 110-1. The server computer 104-2 includes an OS 120-2 and a firmware 122-2 that are executable on the CPU 110-2, and the server computer 104-N includes an OS 120-N and a firmware 122-N that are executable on the CPU 110-N.

Each server computer further includes a main power supply and an auxiliary power supply. For example, the server computer 104-1 includes a main power supply 124-1 that supplies power to the CPU 110-1 and other components of the server computer 104-1, such as a memory, a persistent storage, a network interface controller to communicate over the data network 114, I/O devices, and so forth. The server computer 104-1 also includes an auxiliary power supply 126-1 that supplies power to the management processor 108-1 and the BMC 106-1. The auxiliary power supply 126-1 can power the management processor 108-1 and the BMC 106-1 even if the server computer 104-1 is powered off (i.e., the main power supply 124-1 is off).

Management operations can be performed with respect to the server computer 104-1 using the management processor 108-1 and the BMC 106-1 that are powered by the auxiliary power supply 126-1 even if the main power supply 124-1 is off and the OS 120-1 is not currently running in the server computer 104-1.

A main power supply can include a battery or can be powered by an external power source, such as a wall outlet. An auxiliary power supply can include a battery or any other power source that is separate from the main power supply.

Similarly, the server computer 104-2 includes a main power supply 124-2 to power the CPU 110-2 and other components of the server computer 104-2, and an auxiliary power supply 126-2 to supply power to the management processor 108-2 and the BMC 106-2. The server computer 104-N similarly includes a main power supply 124-N and an auxiliary power supply 126-N.

The primary management processor (which in the example of FIG. 1 is 108-2) coordinates with the remaining management processors ("member management processors") of the cluster of management processors to perform management tasks. For example, the primary management processor 108-2 can assign management tasks to respective member management processors 108-1, 108-N to perform, and each respective member management processor can coordinate with a corresponding BMC to perform the respective management operation. Note that the primary management processor 108-2 can assign management tasks to itself to perform in coordination with the BMC 106-2 in the server computer 104-2.

In some examples, the cluster of management processors is a Kubernetes cluster of nodes. Kubernetes is an open-source orchestration system that includes a primary controlling unit and nodes that are part of the Kubernetes cluster, where a node can refer to a machine in which containers (including workloads) are deployed.

In some examples, a Kubernetes cluster can support the use of multiple primary controlling units to allow for the selection of multiple primary management processors.

A "container" refers to an isolated computing environment in which a service can execute while being isolated from a service executed in another container. Service(s) executing in a container can be provided by a program and any associated components, such as libraries. In some examples according to the present disclosure, the program that can be run in a container can be a management program to perform management tasks of a management processor as discussed above.

According to Kubernetes, a container can reside in a "pod," which can include a collection of containers. A "collection of containers" can refer to a single container or multiple containers. A Kubernetes cluster includes pods that are executable on respective nodes (management processors in the context of FIG. 1).

When a pod runs multiple containers, the containers can share resources of the pod. A pod can include networking and storage resources that can be employed by the container(s) of the pod. A networking resource can include an assigned network address, such as an Internet Protocol (IP) address, a network namespace, a network port, and so forth. A storage resource can refer to a collection of storage volumes (e.g., logical volumes). A pod is considered to be a self-contained, isolated logical host in which programs executed in the container(s) of the pod can run.

In some examples, a full weight version of Kubernetes (referred to as "k8s") can be employed. In other examples, a lightweight version of Kubernetes (referred to as "k3s") can be employed.

Although reference is made to Kubernetes in some examples, in other examples, other clustering arrangements can be employed, such as Pacemaker clusters, Red Hat clusters, and so forth.

In examples where the cluster of management processors includes a Kubernetes cluster, then the primary management processor is a primary node within the Kubernetes cluster, and the remaining management processors are nodes on which containers can be deployed. The primary node (primary management processor) of the Kubernetes cluster can schedule pods on any of the Kubernetes nodes (member management processors).

By leveraging multiple onboard management processors in the cluster, management work can be distributed across the management processors to avoid any potential bottlenecks associated with use of a single system management controller in other examples. Additionally, by distributing the management workload across multiple management processors, more management services than may be possible using a single external system management controller (e.g., an RMC) can be provided.

In addition, failover support is provided in the cluster of management processors for high availability. Failover support can allow another management processor to take over as a primary management processor if a current management processor experiences a fault. Failover support can also allow the primary management processor to reassign management tasks from a first member management processor to a second member management processor if the first member management processor experiences a fault.

In some examples, failing over management tasks from one management processor to another management processor if the management tasks are stateless processes. A stateless process is a process that does not depend on another process, such as on executed in another container or pod or on another management processor.

In other examples, management tasks can be stateful processes that have dependencies on other processes. In such examples, a shared storage can be employed to store data shared by the multiple processes that have dependencies on one another, so that failover over of a management task from one management processor to another management processor is possible.

Figure 2:
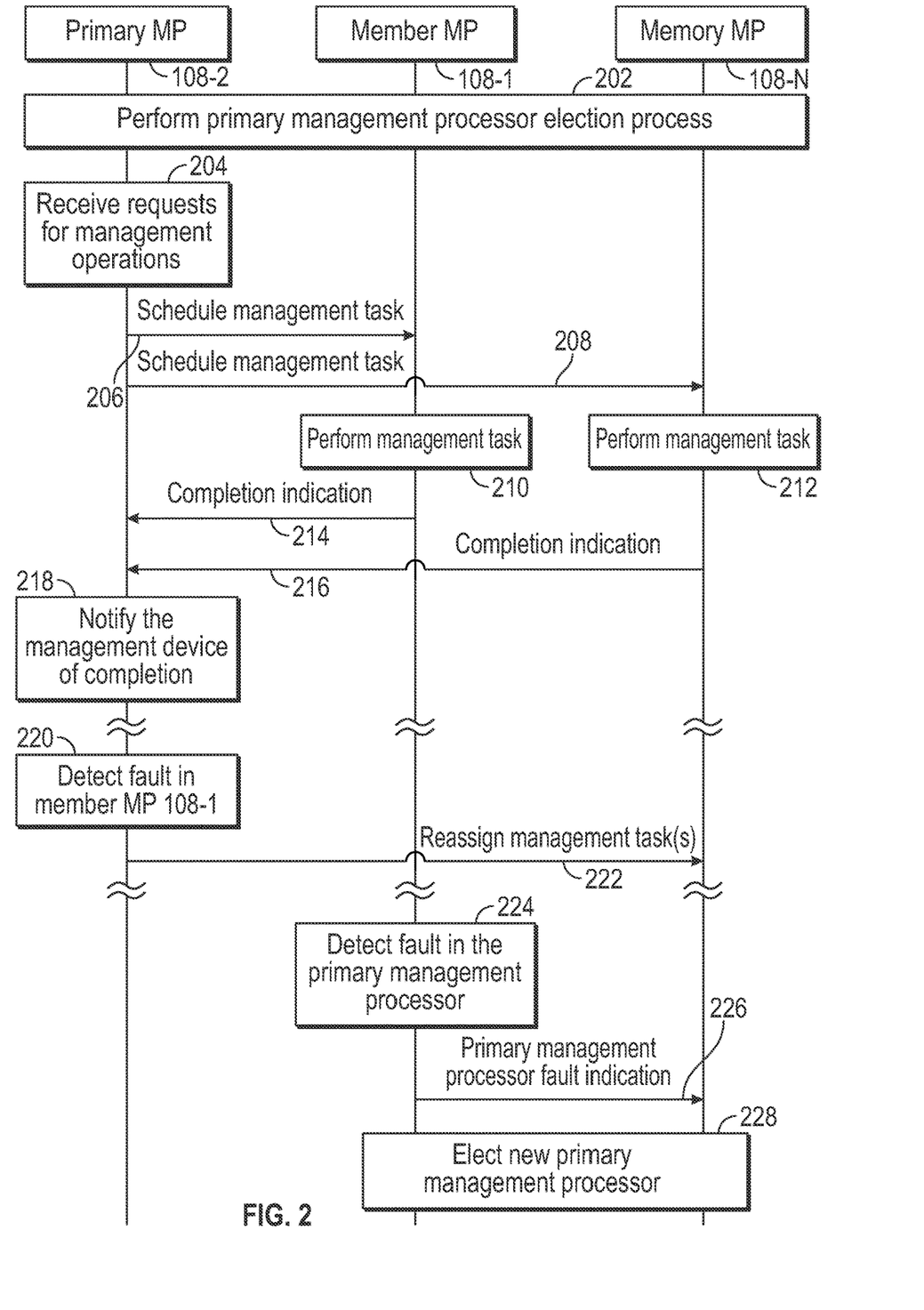
FIG. 2 is a flow diagram of a process of management processors according to some examples.

FIG. 2 is a flow diagram that shows example tasks performed by the primary management processor 108-2 and member management processor is 108-1 and 108-N.

Initially, such as when the management processors start up, or in response to other events (such as specified time intervals, error events, etc.), the management processors 108-1 to 108-N can perform (at 202) a primary management processor election process to elect a primary management process processor using criteria as discussed further above. In examples according to FIGS. 1 and 2, the election process elects the management processor 108-2 as the primary management processor. The remaining management processor is 108-1 to 108-N are member management processors.

The primary management processor 108-2 receives (at 204) requests for management operations, such as from the management device 116 or another entity. The requests can be received through a command line interface, GUI, or REDFISH interface of the primary management processor 108-2.

In response to the requests for management operations, the primary management processor 108-2 schedules (at 206, 208) corresponding management tasks to be performed by the member management processors 108-1 and 108-N, respectively. For example, the primary management processor 108-2 can send an instruction or any other type of indicator to each member management processor to perform the corresponding management task. The instruction or other indicator can include information that identifies the management task to be performed.

In response to the scheduled management tasks, the member management processors 108-1 to 108-N perform (at 210 and 212, respectively) the scheduled management tasks. In response to completion of the corresponding management tasks, the member management processor 108-1 can send (at 214) a completion indication to the primary management processor 108-2, and the member management processor 108-N can send (at 216) a completion indication to the primary management processor 108-2.

A "completion indication" can refer to a message, an information element, a signal, or another indicator that provides an indication that the requested management task has been completed. If the management task were to fail at a member management processor, then the member management processor can send an error indication instead of the completion indication to the primary management processor 108-2.

The primary management processor 108-2 can respond to the completion indications by notifying (at 218) the management device 116 or another requesting entity that the requested management operations have been completed.

The cluster of management processors 108-2 to 108-N can also provide failover support. For example, the primary management processor 108-2 can detect (at 220) whether a member management processor has experienced a fault. For example, in FIG. 2, it is assumed that the primary management processor 108-2 has detected that the member management processor 108-1 has experienced a fault. The detection can be based on use of heartbeat messages sent by each member management processor to the primary management processor 108-2. The heartbeat messages may be sent by a management processor on a periodic basis. In other examples, the primary management processor 108-2 can poll each member management processor (such as on a periodic basis) to trigger a response from the member management processor. If the member management processor does not respond to the polling, then the primary management processor 108-2 can make a determination that the member management processor has experienced a fault and a failover operation should be initiated.

In response to detecting by the primary management processor 108-2 that the member management processor 108-1 has experienced a fault, the primary management processor 108-2 can reassign (at 222) management task(s) of the member management processor 108-1 to the member management processor 108-N. The scheduled management task(s) can include any management task not completed by the member management processor 108-1, or any other management task that should have been assigned to the member management processor 108-1 but which cannot be so assigned due to the fault of the member management processor 108-1.

When a management task of the member management processor 108-1 is reassigned to the member management processor 108-N, the member management processor 108-N would interact with the BMC 106-1 of the server computer 104-1) such as by communicating over the management network 112 to perform the reassigned management task.

Failover support can also include failing over from a current primary management processor to another primary management processor.

Each member management processor is able to detect whether the primary management processor 108-2 has experienced a fault. For example, the member management processor (108-1 or 108-N) can receive heartbeat messages from the primary management processor 108-2 on a periodic basis. As another example, the member management processor (108-1 or 108-N) can poll the primary management processor 108-2 to determine whether the primary management processor 108-2 is still available.

In the example of FIG. 2, it is assumed that the member management processor 108-1 has detected (at 224) that the primary management processor 108-2 has experienced a fault (e.g., the member management processor 108-1 has not received a heartbeat message at an expected time or has not received a response to a polling request). In response, the member management processor 108-1 can initiate a primary management processor failover process by sending (at 226) to each other member management processor an indication of primary management processor fault. In the example of FIG. 2, it is assumed that there are just two member management processors 108-1 and 108-N. In other examples, there may be more than two member management processors.

After the primary management processor fault indication has been sent to initiate a primary management processor failover process, the member management processors 108-1 and 108-N can elect (at 228) a new primary management processor, using similar criteria as noted above for electing a primary management processor.

Figure 3:
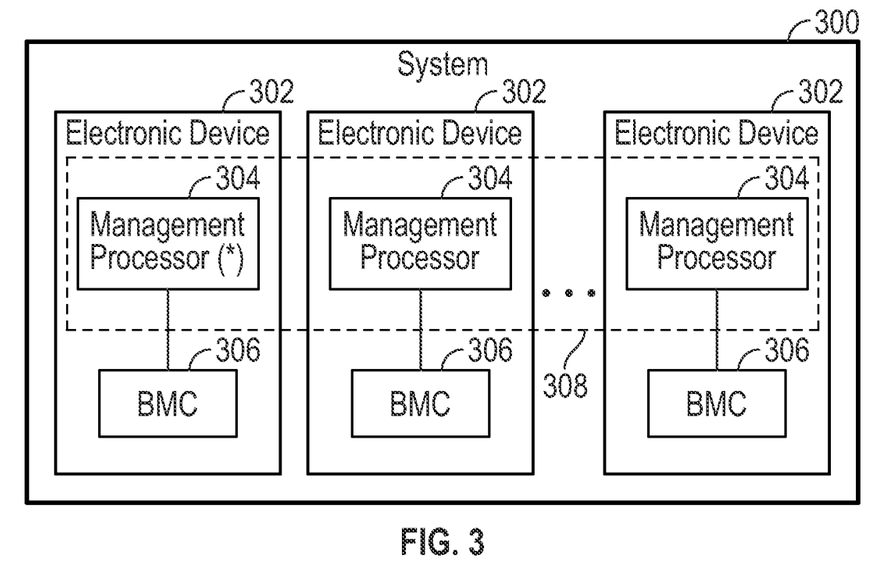
FIG. 3 is a block diagram of a system according to some examples.

FIG. 3 is a block diagram of a system 300 according to some examples. The system 300 can include an arrangement of electronic devices 302, such as the server computers 104-1 to 104-N shown in FIG. 1.

Each of the electronic devices 302 includes a respective management processor 304 and a BMC 306. At least some of the management processors 304 that are part of the electronic devices 302 can form a cluster 308 of management processors.

A management processor of the cluster of the management processors is a primary management processor (indicated by a * in FIG. 3) to act as a management controller for the electronic devices 302. The management controller interacts with the BMC 306 in a respective electronic device 302 to perform management of the respective electronic device 302. The cluster of management processors can perform failover responsive to a fault of the primary management processor to select another management processor of the cluster of management processors as the management controller.

In some examples, the management controller (the primary management processor 304 indicated with a * in FIG. 3) can schedule management tasks to be performed by multiple management processors of the cluster 308 of the management processors that are part of the arrangement of electronic devices 302.

In some examples, the management controller can schedule execution of containers on the multiple management processors to perform the management tasks, where each container includes a management program to interact with the BMC 306 of an electronic device 302 to perform management of the electronic device 302.

In some examples, the management controller can detect a fault in a given management processor of the multiple management processors, and in response to detecting the fault, schedule a management task of the given management processor on another management processor of the cluster of the management processors.

In some examples, another management processor of the cluster 308 of management processors is a further primary management processor to act as a further management controller for the plurality of electronic devices. The multiple primary management processors can serve as management controllers in a high-availability arrangement, to provide load balancing and/or failover support.

In some examples, the management controller is a proxy for a management device (e.g., 116 in FIG. 1) to access the arrangement of electronic devices 302 to perform management of the electronic devices 302.

In some examples, the management processors of the cluster 308 are to collectively elect the primary management processor using a distributed election process.

In some examples, the primary management processor can provide a management interface (e.g., a command line interface, a GUI, a REDFISH interface, etc.) accessible by a remote management device (e.g., 116 in FIG. 1) over a management network.

Figure 4:
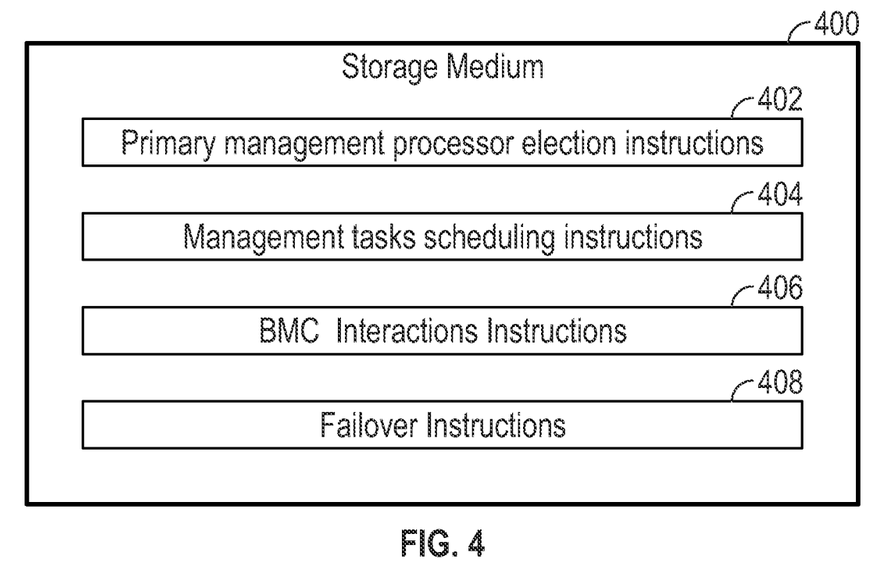
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause a system to perform various tasks.

The machine-readable instructions include primary management processor election instructions 402 to elect, from among a plurality of management processors in respective electronic devices, a primary management processor. The election of the primary management processor can be based on any one or some combination of criteria discussed further above.

The machine-readable instructions include management tasks scheduling instructions 404 to schedule, by the primary management processor, management tasks to be performed by respective management processors of the plurality of management processors. In some examples, the machine-readable instructions receive, from a remote management device at the primary management processor, requests for management operations, where the scheduling of the management tasks by the primary management processor is responsive to the requests.

The machine-readable instructions include BMC interactions instructions 406 to interact, by each corresponding management processor of the plurality of management processors, with a BMC in a respective electronic device of the electronic devices to perform a management task with respect to the respective electronic device. A management processor can instruct a BMC to perform a management task, and the BMC can perform the management task in the respective electronic device.

The machine-readable instructions include failover instructions 408 to perform failover from the primary management processor to another management processor in response to detecting a fault of the primary management processor. In response to detecting the fault of the primary management processor, another primary management processor is elected.

Figure 5:
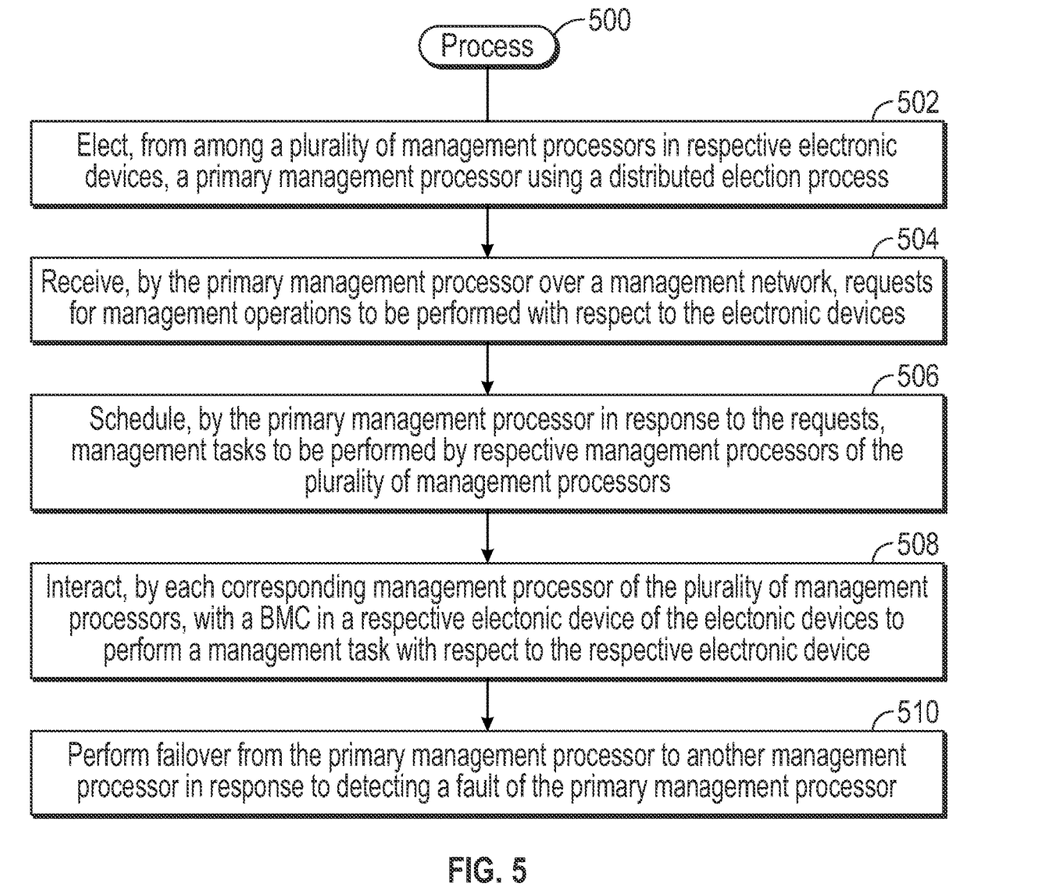
FIG. 5 is a flow diagram of a process according to some examples.

FIG. 5 is a flow diagram of a process 500 according to some examples. The process 500 includes electing (at 502), from among a plurality of management processors in respective electronic devices, a primary management processor using a distributed election process. In some examples, the plurality of management processors are part of a cluster, such as a Kubernetes cluster of nodes or another type of cluster.

The process 500 includes receiving (at 504), by the primary management processor over a management network, requests for management operations to be performed with respect to the electronic devices. The requests can be received by the primary management processor from a remote management device, for example.

The process 500 includes scheduling (at 506), by the primary management processor in response to the requests, management tasks to be performed by respective management processors of the plurality of management processors. This distributes the management workload across multiple management processors.

The process 500 includes interacting (at 508), by each corresponding management processor of the plurality of management processors, with a BMC in a respective electronic device of the electronic devices to perform a management task with respect to the respective electronic device.

The process 500 includes performing (at 510) failover from the primary management processor to another management processor in response to detecting a fault of the primary management processor.

A storage medium (e.g., 400 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A system comprising:
a plurality of electronic devices comprising respective management processors and respective baseboard management controllers (BMCs),
wherein the management processors form a cluster of management processors, and wherein the management processors are to collectively elect, using a distributed election process, a first management processor of the cluster of management processors as a primary management processor based on respective communication bandwidths of the management processors, the primary management processor to act as a management controller for the plurality of electronic devices,
the management controller to assign a management task to a second management processor of the cluster of management processors, wherein the second management processor is in a first electronic device of the plurality of electronic devices, and the second management processor to interact with a first BMC in the first electronic device to start the management task in the first electronic device, and
the management controller to:
detect a fault of the second management processor in the first electronic device, and
in response to detecting the fault of the second management processor, reassign the management task of the second management processor to a third management processor in a second electronic device that is separate from the first electronic device,
wherein after the reassignment of the management task to the third management processor, the third management processor in the second electronic device is to interact with the first BMC in the first electronic device to complete the management task.

2. The system of claim 1, wherein the management controller is to schedule management tasks to be performed by multiple management processors of the cluster of management processors that are part of the plurality of electronic devices.

3. The system of claim 2, wherein the management controller is to schedule execution of containers on the multiple management processors to perform the management tasks, wherein each container of the containers is an isolated computing environment and comprises a management program to interact with the BMC of an electronic device of the plurality of electronic devices to perform management of the electronic device.

4. The system of claim 1, wherein the cluster of management processors is to perform failover responsive to a fault of the primary management processor to select another management processor of the cluster of management processors as the management controller.

5. The system of claim 1, wherein another management processor of the cluster of management processors is a further primary management processor to act as a further management controller for the plurality of electronic devices.

6. The system of claim 4, wherein the fault of the primary management processor is indicated by a further management processor of the cluster of management processors responsive to the further management processor failing to receive a heartbeat message from the primary management processor.

7. The system of claim 1, wherein the management controller is part of one of the plurality of electronic devices.

8. The system of claim 1, wherein the management controller is a proxy for a management device to access the first and second electronic devices to perform the management task.

9. The system of claim 1, wherein the cluster of management processors comprises a Kubernetes cluster.

10. The system of claim 1, wherein each corresponding electronic device of the plurality of electronic devices comprises an auxiliary power supply to supply power to the BMC and the management processor of the corresponding electronic device, wherein the BMC and the management processor of the corresponding electronic device remain on even when the corresponding electronic device is powered off.

11. The system of claim 1, wherein the primary management processor is to provide a management interface accessible by a remote management device over a management network.

12. The system of claim 11, wherein the management interface comprises an application programming interface for management of electronic devices.

13. A non-transitory machine-readable storage medium comprising instructions that upon execution cause a system to:
elect, by a plurality of management processors in respective electronic devices, a primary management processor from among the plurality of management processors using a distributed election process based on respective communication bandwidths of the plurality of management processors;
schedule, by the primary management processor, a management task to be performed by a first member management processor of the plurality of management processors, wherein the first member management processor is in a first electronic device of the electronic devices;
interact, by the first member management processor, with a baseboard management controller (BMC) in the first electronic device to start the management task in the first electronic device;
detect, at the primary management processor a fault of the first member management processor in the first electronic device;
in response to detecting the fault of the first member management processor, reassign the management task of the first member management processor to a second member management processor in a second electronic device that is separate from the first electronic device; and
after the reassignment of the management task to the second member management processor, interact, by the second member management processor in the second electronic device, with the BMC in the first electronic device to complete the management task.

14. The non-transitory machine-readable storage medium of claim 13, wherein the instructions upon execution cause the system to:
receive, from a remote management device at the primary management processor, a request for a management operation, wherein the scheduling of the management task by the primary management processor is responsive to the request.

15. The non-transitory machine-readable storage medium of claim 13, wherein the scheduling of the management task by the primary management processor comprises scheduling a container on the first member management processor, the container being an isolated computing environment and comprising a management program.

16. The non-transitory machine-readable storage medium of claim 15, wherein the primary management processor is internal to one of the electronic devices.

17. A method comprising:
electing, by a plurality of management processors in respective electronic devices, a primary management processor from among the plurality of management processors using a distributed election process based on respective communication bandwidths of the plurality of management processors;
receiving, by the primary management processor over a management network, a request for a management operation to be performed with respect to a first electronic device of the electronic devices;
scheduling, by the primary management processor in response to the request, a management task to be performed by a first member management processor of the plurality of management processors, wherein the first member management processor is in the first electronic device;
interacting, by the first member management processor, with a first baseboard management controller (BMC) in the first electronic device to start the management task in the first electronic device;
detecting, by the primary management processor, a fault of the first member management processor in the first electronic device;
in response to detecting the fault of the first member management processor, reassigning the management task of the first member management processor to a second member management processor in a second electronic device that is separate from the first electronic device; and
after the reassignment of the management task to the second member management processor, interacting, by the second member management processor in the second electronic device, with the BMC in the first electronic device to complete the management task.

* * * * *